United States Patent
Liao et al.

(10) Patent No.: US 11,184,291 B2
(45) Date of Patent: Nov. 23, 2021

(54) SCHEDULING RESOURCES

(71) Applicant: NEW H3C TECHNOLOGIES CO., LTD., Hangzhou (CN)

(72) Inventors: Yishun Liao, Beijing (CN); Kao Zhang, Beijing (CN); Yuanfang Kou, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 0 days.

(21) Appl. No.: 16/472,861

(22) PCT Filed: Dec. 20, 2017

(86) PCT No.: PCT/CN2017/117507
§ 371 (c)(1),
(2) Date: Jun. 21, 2019

(87) PCT Pub. No.: WO2018/113701
PCT Pub. Date: Jun. 28, 2018

(65) Prior Publication Data
US 2019/0372907 A1    Dec. 5, 2019

(30) Foreign Application Priority Data

Dec. 21, 2016 (CN) .......................... 201611192753.2

(51) Int. Cl.
*H04L 12/911* (2013.01)
*H04L 12/66* (2006.01)
(Continued)

(52) U.S. Cl.
CPC .............. *H04L 47/70* (2013.01); *H04L 12/66* (2013.01); *H04L 61/2007* (2013.01);
(Continued)

(58) Field of Classification Search
CPC ..... H04L 47/70; H04L 67/16; H04L 61/2007; H04L 63/0892; H04L 29/08; H04L 12/66;
(Continued)

(56) References Cited

U.S. PATENT DOCUMENTS 6,735,198 B1 *   5/2004   Edsall ..................... H04L 45/54
                                                            370/389
6,807,172 B1 *  10/2004   Levenson ........... H04L 49/3009
                                                            370/389
(Continued)

FOREIGN PATENT DOCUMENTS

CN       101247421 A       8/2008
CN       103702366 A       4/2014
(Continued)

OTHER PUBLICATIONS

ISA State Intellectual Property Office of the People's Republic of China, Written Opinion of the International Searching Authority Issued in Application No. PCT/CN2017/117507, dated Mar. 20, 2018, WIPO, 4 pages.

(Continued)

*Primary Examiner* — Muhammad Raza
(74) *Attorney, Agent, or Firm* — McCoy Russell LLP (57) ABSTRACT

Methods of scheduling resources, distributed access gateway devices and machine-readable storage devices are provided in examples of the present disclosure. In one aspect, a first service board on a distributed access gateway device creates a first software user entry corresponding to a first user on a data plane, determines whether there is an idle hardware resource on the first service board, obtains a slot ID of a second service board comprising an idle hardware resource on the data plane when determining that there is no idle hardware resource on the first service board, and sends the first software user entry to the second service board according to the slot ID of the second service board on the (Continued)

data plane such that the second service board creates a first hardware user entry corresponding to the first user on a data plane of the second service board.

11 Claims, 6 Drawing Sheets

(51) Int. Cl.
  *H04L 29/12* (2006.01)
  *H04L 29/08* (2006.01)
  *H04L 29/06* (2006.01)
(52) U.S. Cl.
  CPC ........ *H04L 63/029* (2013.01); *H04L 63/0892* (2013.01); *H04L 67/16* (2013.01)
(58) Field of Classification Search
  CPC ... H04L 12/287; H04L 63/029; H04L 63/102; G06F 21/6218
  See application file for complete search history.

(56) References Cited

U.S. PATENT DOCUMENTS

| | | | |
|---|---|---|---|
| 2008/0240106 A1* | 10/2008 | Schlenk | H04L 45/54 370/392 |
| 2008/0298230 A1 | 12/2008 | Luft et al. | |
| 2011/0295991 A1* | 12/2011 | Aida | H04L 45/38 709/223 |
| 2012/0254389 A1* | 10/2012 | Amemiya | H04L 67/141 709/223 |
| 2013/0019276 A1 | 1/2013 | Biazetti et al. | |
| 2013/0195105 A1* | 8/2013 | Basso | H04L 45/72 370/389 |
| 2014/0040891 A1* | 2/2014 | Karve | G06F 9/45545 718/1 |
| 2014/0241353 A1* | 8/2014 | Zhang | H04L 49/253 370/390 |
| 2014/0247829 A1* | 9/2014 | Gautam | H04L 49/15 370/392 |
| 2015/0016477 A1* | 1/2015 | Ogawa | H04L 7/0016 370/503 |
| 2015/0169351 A1* | 6/2015 | Song | H04L 45/66 718/1 |
| 2016/0020992 A1* | 1/2016 | Wu | G06F 15/167 709/212 |
| 2016/0034548 A1* | 2/2016 | Khosrowpour | G06F 9/452 707/639 |
| 2016/0352622 A1* | 12/2016 | Gautam | H04L 49/201 |

FOREIGN PATENT DOCUMENTS

| | | |
|---|---|---|
| CN | 104320272 A | 1/2015 |
| CN | 104852859 A | 8/2015 |
| EP | 2536068 A1 | 12/2012 |
| JP | 2006270925 A | 10/2006 |
| JP | 2014158242 A | 8/2014 |
| WO | 2015039699 A1 | 3/2015 |

OTHER PUBLICATIONS

State Intellectual Property Office of the People's Republic of China, Office Action and Search Report Issued in Application No. 201611192753.2, dated Aug. 15, 2019, 12 pages. (Submitted with Partial Translation).
European Patent Office, Extended European Search Report Issued in Application No. 17882416.5, dated Oct. 17, 2019, Germany, 7 pages.
ISA State Intellectual Property Office of the People's Republic of China, International Search Report Issued in Application No. PCT/CN2017/117507, dated Mar. 20, 2018, WIPO, 4 pages.

* cited by examiner

SCHEDULING RESOURCES

CROSS REFERENCE TO RELATED APPLICATIONS

This present application is a U.S. National Phase of International Patent Application Serial No. PCT/CN2017/117507 entitled "SCHEDULING RESOURCES," filed on Dec. 20, 2017. International Patent Application Serial No. PCT/CN2017/117507 claims priority to Chinese Patent Application No. 201611192753.2 filed on Dec. 21, 2016. The entire contents of each of the above-cited applications are hereby incorporated by reference for all purposes.

BACKGROUND

A Broadband Remote Access Server (BRAS) service system mainly includes a user host, a BRAS device and an Authentication Authorization and Accounting (AAA) server. The BRAS device can send user information from the user host to the AAA server to perform authentication, authorization and accounting for a user. After the user passes the authentication, the user host can access an external network, for example, the Internet, via the BRAS device.

DETAILED DESCRIPTION OF THE EMBODIMENTS

The technical solutions of embodiments of the present disclosure will be described clearly and fully below in combination with the drawings in the embodiments of the present disclosure. It is apparent that the described embodiments are merely part of embodiments of the present disclosure rather than all embodiments. Other embodiments achieved by those of ordinary skill in the art based on the embodiments in the present disclosure without paying creative work shall all fall into the scope of protection of the present disclosure.

Figure 1:
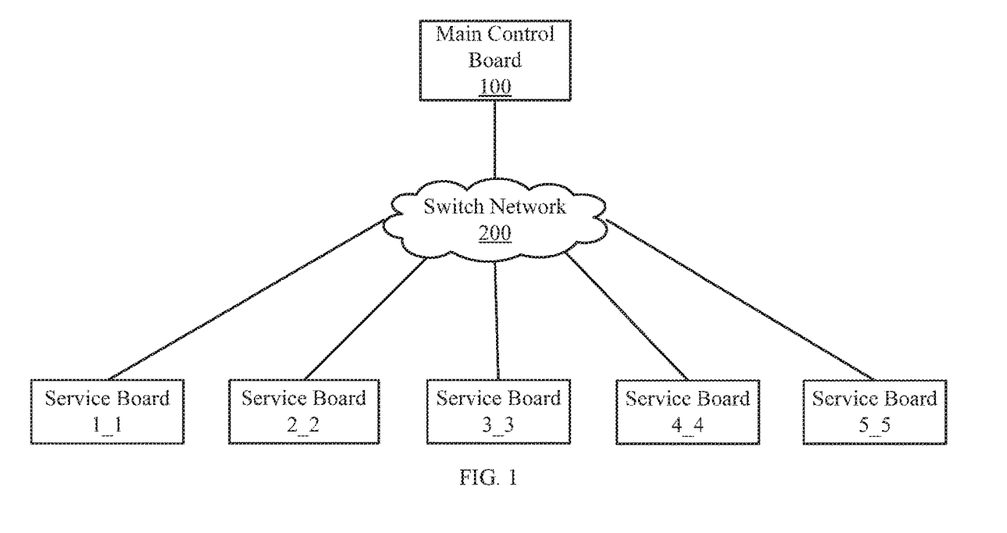
FIG. 1 is a schematic diagram illustrating architecture of a BRAS device according to an example of the present disclosure.

In FIG. 1, a BRAS device with a distributed hardware architecture includes a main control board 100 and a plurality of service boards 1_1 to 1_5. The main control board 100 controls and manages all the service boards, and synchronizes global information. A service board performs access authentication and packet forwarding. A process that the service board performs the access authentication and the packet forwarding includes procedures as follows.

On a data plane, an access authentication request packet is sent by a user host. When the packet is identified to be a protocol packet, and the packet is sent to a control plane to be processed.

After an access authentication request packet is received on the control plane, user authentication is performed through interaction with an AAA server. After the user authentication successes, a software user entry corresponding to the user is created on the control plane, where the software user entry is recorded in a memory. Then, the control plane notifies the data plane to create a user entry.

After a notification is received on the data plane, a software user entry and a hardware user entry corresponding to the user is created on the data plane, where the hardware user entry is recorded on a component such as a Ternary Content Addressable Memory (TCAM).

After the user authentication successes, a data packet sent by the user host is received on the data plane. When the data packet is identified to be a non-protocol packet, a corresponding hardware user entry is searched for. After the hardware user entry is searched out, corresponding processing such as counting traffic and duration and user strategy control is performed according to the hardware user entry. The data packet is forwarded through a route.

In an example, the control plane above is a Central Processing Unit (CPU), and the data plane above is a drive program.

In an example, each service board has a fixed hardware resource specification. For example, when a service board is accessible by 16 K users, the total number of configurable hardware user entries is 16 K. When all hardware resources of a particular service board are occupied, a hardware user entry for a new user cannot be sent that is because there is no enough hardware resource, which causes that the new user cannot go online.

To solve the above problem, a method of scheduling resources and a distributed access gateway device are provided according to examples of the present disclosure. The method may be executed by a first service board in a distributed access gateway device in FIG. 1, e.g., a data plane on the first service board. In the method, a first software user entry corresponding to a first user is created after the first user pass authentication, it is determined whether there is an idle hardware resource on the first service board, a slot ID of a second service board including an idle hardware resource on the data plane is obtained when determining that there is no idle hardware resource on the first service board, wherein the second service board is selected from a resource group, and the resource group comprises a plurality of service boards on the distributed access gateway device, and the first software user entry is sent to the second service board according to the obtained slot ID of the second service board on the data plane, so that the second service board creates a hardware user entry corresponding to the first user on the data plane of the second service board.

In the method above, in a case that the data plane on the first service board creates a software user entry corresponding to a user and desires to create a hardware user entry corresponding to the user, when it is determined that there is no idle hardware resource on the first service board, the data plane obtains the slot ID of the second service board on which there is an idle hardware resource in a resource group, and sends the created software user entry to the second service board according to the obtained slot ID in a way that the second service board creates a hardware user entry corresponding to the user. Thus, when there are no enough hardware resource on the first service board, the hardware user entry for a new user is configured to the second service board, and the second service board shares hardware resources with the first service board on which there is no enough hardware resource, thereby ensuring that the new user is able to go online, and the hardware resources of the distributed gateway device are reasonably utilized and scheduled.

A distributed BRAS device in FIG. 1 is taken as an example. The distributed BRAS device includes a main control board 100 and a plurality of service boards. In an example, the distributed BRAS device includes service boards supporting a BRAS function and service boards not supporting the BRAS function. In examples of the present disclosure, only the service boards supporting the BRAS function are considered, e.g., the service boards described below are service boards supporting the BRAS function.

A resource group is maintained on a main control board, and the resource group includes a plurality of service boards supporting the BRAS function in the distributed BRAS device. In an example, the main control board records resource group information which includes a slot ID, a hardware resource specification and a hardware resource usage of each of the service boards in the resource group, where the hardware resource usage may be expressed by the number of idle hardware resources.

It is assumed that the resource group includes five service boards in FIG. 1, service boards 1_1, 1_2, 1_3, 1_4 and 1-5, where a slot ID of the service board 1_1 is Slot 2_1, a slot ID of the service board 1_2 is Slot 2_2, a slot ID of the service board 1_3 is Slot 2_3, a slot ID of the service board 1_4 is Slot 2_4, and a slot ID as of the service board 1_5 is Slot 2_5. the resource group information is recorded in Table on the main control board.

TABLE 1

| Slot ID | Hardware Resource Specification (K) | Idle Hardware Resources (K) |
| --- | --- | --- |
| Slot2_1 | 32 | 20 |
| Slot2_2 | 16 | 0.1 |
| Slot2_3 | 16 | 15 |
| Slot2_4 | 32 | 10 |
| Slot2_5 | 16 | 7 |

Each of the service boards in the resource group notifies the main control board when the hardware resource usage of the service board is changed, so that the main control board helps to update the idle hardware resources of the service board in Table 1 in real time.

When Table 1 is updated, for example, a new service board is added, a service board is removed, or the number of the idle hardware resources of a service board is changed, the main control board synchronizes the updated information to each of the service boards in the resource group to ensure consistency for resource group information on the service boards and the main control board. The resource group information in Table 1 is further maintained on the control plane of each service board in the resource group.

After receiving a notification message indicating there is no enough hardware resource from the data plane, the control plane of the first service board selects a second service board on which there is an idle hardware resource from the resource group according to the resource information and send a slot ID of the second service board to the data plane.

Optionally, after receiving the notification message indicating that there is no enough hardware resource from the data plane, the control plane of the first service board obtains the resource group information from the main control board, select a second service board on which there is an idle hardware resource from the resource group according to the obtained resource group information, and send a slot ID of the second service board to the data plane.

Optionally, after receiving the notification message indicating that there is no enough hardware resource from the data plane, the control plane of the first service board notifies the main control board to select a second service board on which there is an idle hardware resource from the resource group according to the resource group information. The main control board returns back a slot ID of the second service board. After obtaining the slot ID of the second service board, the control plane sends the slot ID to the data plane.

A service board is added into a resource group in a manual static configuration manner. Based on the manual static configuration manner, an administrator selectively adds a service board into the resource group. For example, if a service board supports the BRAS function but has extremely low hardware resource specification and is mainly used to realize another function, the service board is not added into the resource group.

Further, a service board is added into a resource group in a dynamic manner. In an example, after a newly-inserted service board is stared, the main control board identifies a type of the service board. When the service board is determined to support the BRAS function, the service board is added into the resource group, and a slot ID, hardware resource specification and idle hardware resources of the service board are added into Table 1. In such a manner, the main control board automatically adds a service board into the resource group without manual configuration of an administrator.

In an example of the present disclosure, a method of scheduling resources includes procedures as follows.

After receiving an access authentication request packet set by a user host, the data plane on the service board 1_1 sends the packet to the control plane to be processed when identifying that the packet is a protocol packet. After receiving the access authentication request packet, the control plane performs the authentication for the user through interaction with an AAA server. After the user passes the authentication, the control plane creates a software user entry corresponding to the user and notifies the data plane to create a user entry.

Figure 2:
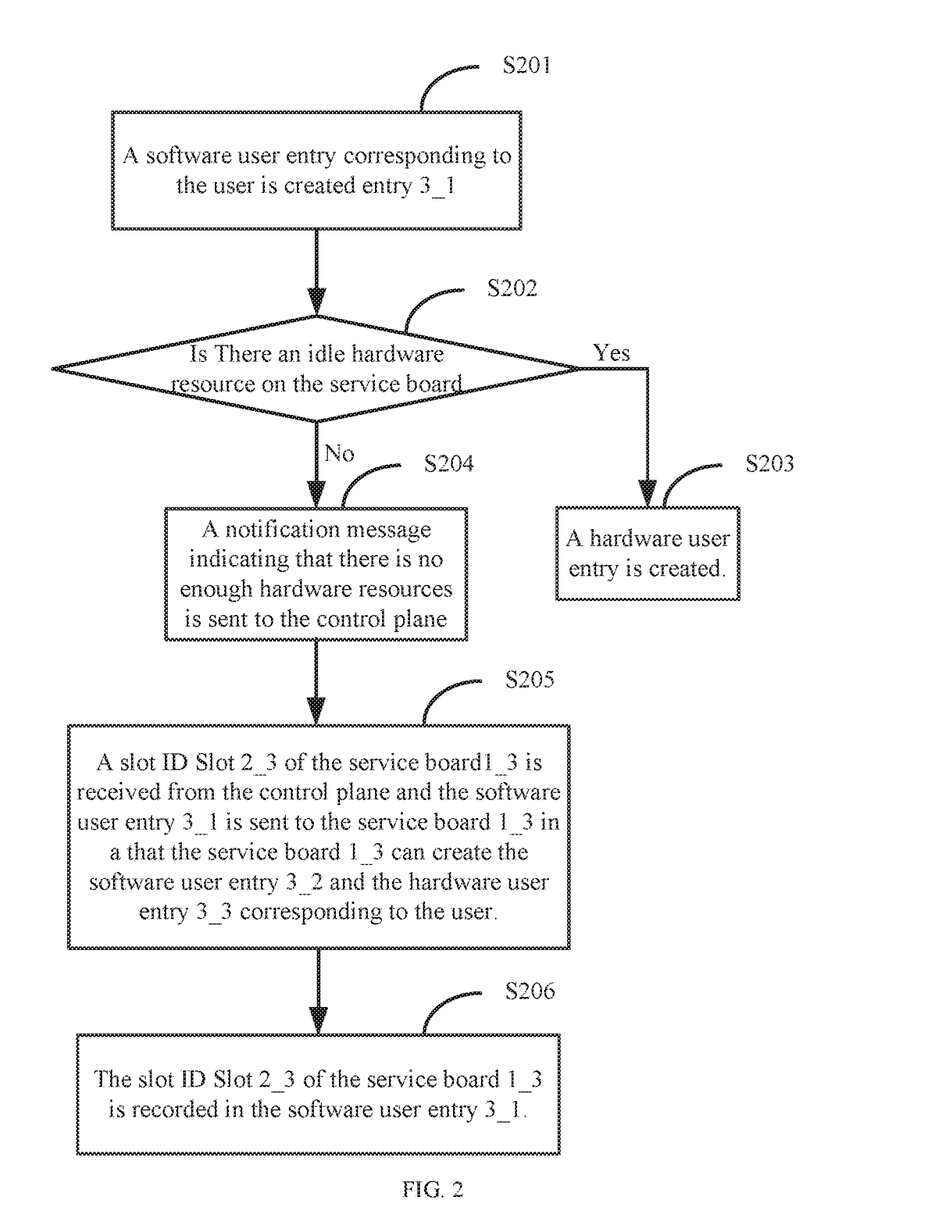
FIG. 2 is a flowchart illustrating a method of scheduling resources according to an example of the present disclosure.

After receiving a notification of creating a user entry from the control plane, the data plane on the service board 1_1 will execute procedures in FIG. 2.

At block S201, a software user entry corresponding to the user is created. To make description convenience, the entry is denoted as entry 3_1.

The entry 3_1 may be stored in a memory of the data plane. In Table 2_1, the entry 3_1 includes a user name, an MAC address and an IP address of a user host, rate limit information, a slot ID of an original service board accessed by the user host, an ID of a port connected with the user host on the service board (i.e., original port), and the like.

TABLE 2-1

| User Name | MAC Address | IP Address | Rate Limit Information | Original Service Board | Original Port | ... |
|---|---|---|---|---|---|---|
| User | PC-MAC | PC-IP | XXX | Slot2_1 | PortA | ... |

At block S202, it is determined whether there is an idle hardware resource on the service board. If yes, procedures in block S203 are executed, otherwise, procedures in block S204 are executed.

At block S203, a hardware user entry corresponding to the user is created, and the process exits.

At block S204, a notification message indicating that there is no enough hardware resources is sent to the control plane.

When it is determined that there is no idle hardware resource on the service board 1_1, a flag is further added into the software user entry 3_1 in Table 2-1 to indicate that there is no idle hardware resource on the service board and it is desired to redirect to another service board. For example, the flag is expressed to be NoResRedi. Accordingly, the entry 3_1 as shown in table 2-1 is updated as shown in table 2-2.

TABLE 2_2

| User Name | MAC Address | IP Address | Rate Limit Information | Original Service Board | Original Port | ... | Flag |
|---|---|---|---|---|---|---|---|
| User | PC-MAC | PC-IP | XXX | Slot2_1 | PortA | ... | NoResRedi |

When the resource group information in Table 1 is stored on the control plane, the control plane on the service board 1_1 selects a service board on which there is an idle hardware resource from the resource group according to the resource group information after receiving the notification message, e.g., the service board 1_3 with a slot ID Slot 2_3 which has the highest hardware resource idleness rate, and send the Slot 2_3 to the data plane.

Optionally, when the resource group information is not stored on the control plane, the control plane of the service board 1_1 obtains the resource group information from the main control board after receiving the notification message, select a service board on which there is an idle hardware resource from the resource group according to the obtained resource group information in Table 1, e.g., the service board 1_3 with the slot ID Slot 2_3 which has the highest hardware resource idleness rate is selected, and send the Slot 2_3 to the data plane.

Optionally, when the resource group information is not stored on the control plane, the control plane on the service board 1_1 notifies the main control board to select a service board on which there is an idle hardware resource from the resource group according to the resource group information in table 1 after receiving the notification message, e.g., the service board 1_3 with the slot ID Slot 2_3 which has the highest hardware resource idleness rate is selected, and send the Slot 2_3 to the data plane.

At block S205, the Slot 2_3 is received from the control plane and the created software user entry 3_1 is sent to the service board 1_3.

In an example, the data plane on the service board 1_1 sends content of the entry 3_1 to the service board 1_3 through an inter-board communication message, where the inter-board communication message is an Inter-Process Communication (IPC) message.

After receiving the inter-board communication message, the data plane on the service board 1_3 creates a software user entry 3_2 and a hardware user entry 3_3 corresponding to the user according to the content of the software user entry 3_1 carried in the message, and record the slot ID Slot 2_1 of the service board 1_1 in the entry 3_2 to indicate that the original service board accessed by the user is the service board 1_1. The entry 3_2 and the entry 3_3 are as shown in Tables 3 and 4, respectively.

TABLE 3

| User Name | MAC Address | IP Address | Rate Limit Information | ... | Hardware User Entry Index | Original Service Board |
|---|---|---|---|---|---|---|
| User | PC-MAC | PC-IP | XXX | ... | entry3_3 | Slot2_1 |

TABLE 4

| User Name | MAC Address | IP Address | Rate Limit Information | ... |
|---|---|---|---|---|
| User | PC-MAC | PC-IP | XXX | ... |

The software user entry 3_2 in Table 3 is stored in a memory of the data plane. The entry 3_2 includes a user name, an MAC address and an IP address of a user host, rate limit information, an index of a corresponding hardware user entry 3_3, a slot ID of an original service board accessed by the user host, and the like. The hardware user entry 3_3 in Table 4 is stored in a component such as a TCAM. The entry 3_3 includes a user name, an MAC address and an IP address of a user host, rate limit information, an ID of a group to which a user belongs and a name of a domain to which a user belongs, a corresponding user strategy ID, and the like.

After creating the entry 3_2 and the entry 3_3, the data plane on the service board 1_3 returns an inter-board communication message back to the service board 1_1, where the inter-board communication message indicates that the hardware user entry is successfully created.

At block S206, the slot ID Slot 2_3 of the service board 1_3 is recorded in the software user entry 3_1 in Table 2-2 to indicate that the user is redirected to the service board 1_3 after the inter-board communication message indicating that the hardware user entry is successfully created is received from the service board 1_3. Accordingly, the entry 3_1 is updated as shown in Table 2-3:

TABLE 2-3

| User Name | MAC Address | IP Address | Rate Limit Information | Original Service Board | Original Port | ... | Flag | Redirected Service Board |
|---|---|---|---|---|---|---|---|---|
| User | PC-MAC | PC-IP | XXX | Slot2_1 | PortA | ... | NoResRedi | Slot2_3 |

When there is no idle hardware resource on the service board 1_1, the user accessing the service board 1_1 is redirected to the service board 1_3, and the service board 1_3 creates the hardware user entry corresponding to the user, to help the user go online, and help integration, sharing and scheduling of the hardware resources of different service boards in the resource group.

Further, after creating the software user entry 3_2 and the hardware user entry 3_3, the data plane on the service board 1_3 further creates a route entry including an IP address of a user host. The route entry is for example as shown in Table 5.

TABLE 5

| IP Address | DDev (destination device) | DPort (destination port) |
|---|---|---|
| PC-IP | RG | Slot2_3 |

In Table 5, the destination device ID in the route entry is the ID of the resource group, which is denoted as RG; and the destination port ID is the slot ID Slot 2_3 of the service board 1_3. The service board 1_3 further synchronizes the route entry in Table 5 to other service boards through a main control board, which include service boards 1_1, 1_2, 1_4 and 1_5.

After receiving the route entry in table 5 from the service board 1_3, each of the service boards 1_1, 1_2, 1_4 and 1_5 sends the route entry in any of two ways as follows.

Based on a first way, the route entry is directly stored on a data plane.

When the first way is adopted, route entries including PC-IP on the data planes of the service boards 1_1, 1_2, 1_4 and 1_5 is as shown in Table 5.

Based on a second way, a corresponding software user entry is searched for according to the IP address PC-IP in the route entry; when no corresponding software user entry is searched out, which indicates that the user host with the IP address PC-IP does not access the service board, the route entry is directly stored on the data plane; when a corresponding software user entry is searched out, which indicates that the user host with the IP address the PC-IP accesses the service board, the route entry is stored, the DDev in the stored route entry is modified to the slot ID of the service board, and the DPort in the stored route entry is modified to the original port ID in the software user entry searched out.

When the second way is adopted, the service board 1_1 searches out the software user entry as shown in Table 2-3, thus, the route entry including the PC-IP on the data plane of the service board 1_1 is as shown in Table 6. The service boards 1_2, 1_4 and 1_5 does not search out the corresponding software user entry, the route entries including the PC-IP on the data planes of these service boards are as shown in Table 5.

TABLE 6

| IP Address | DDev | DPort |
|---|---|---|
| PC-IP | Slot2_1 | PortA |

Figure 3:
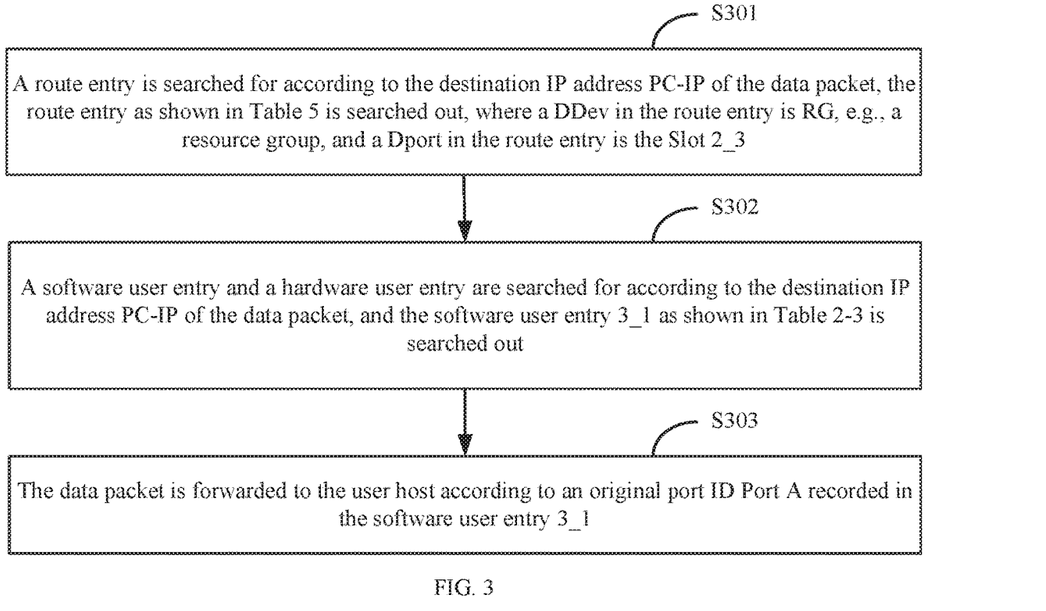
FIG. 3 is a flowchart illustrating a process of forwarding a data packet sent to a user host according to an example of the present disclosure.
Figure 4:
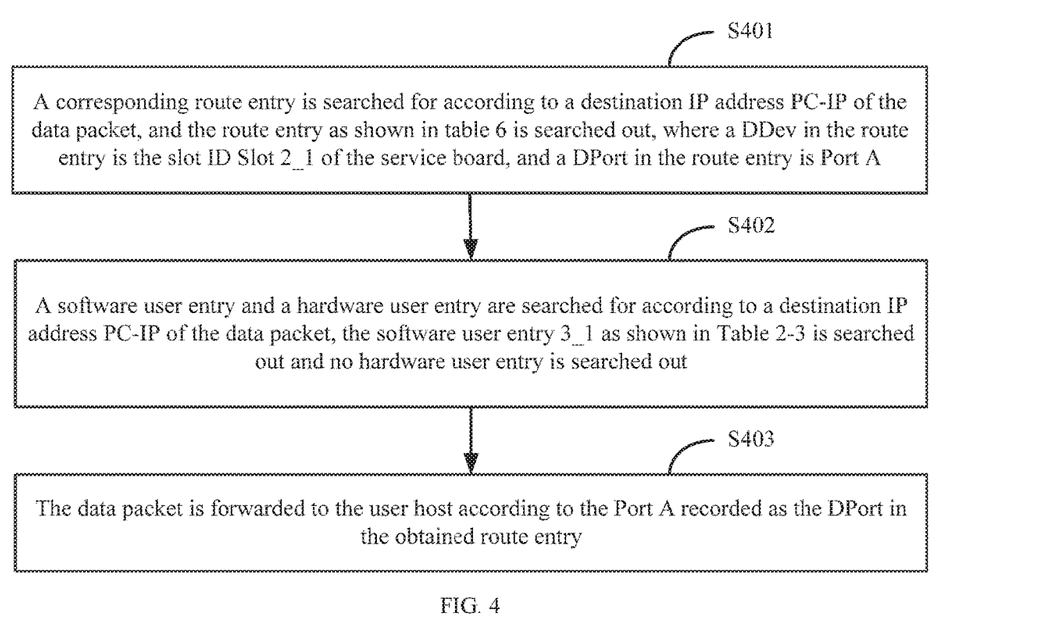
FIG. 4 is a flowchart illustrating a process of forwarding a data packet sent to a user host according to an example of the present disclosure.

It can be seen from above that the route entries including the PC-IP on the data planes of the service boards 1_2, 1_4 and 1_5 are as shown in Table 5 regardless which way is adopted. For the service board 1_1, the route entry including the PC-IP on the data plane is as shown in Table 5 when the first manner is adopted, the route entry including the PC-IP on the data plane is as shown in Table 6 when the second manner is adopted. The route entries are different when different ways are adopted, and forwarding mechanisms for packets sent to the user host are different accordingly. In an example, a forwarding mechanism as shown in FIG. 3 is used when the first way is adopted, a forwarding mechanism as shown in FIG. 4 is used when the second way is adopted.

In an example, a process of forwarding a data packet from a user host to an Internet includes procedures as follows.

After the authentication successes, the user host sends a data packet with a source IP address PC-IP to access an Internet. After receiving the data packet, the data plane of the service board 1_1 identifies that the packet is a non-protocol packet, search for a corresponding route entry according to a destination IP address of the data packet, and search for a software user entry and a hardware user entry according to the source IP address PC-IP of the data packet. And the software user entry 3_1 as shown in table 2-3 is searched out but no hardware user entry is searched out. In this case, NoResRedi is recorded in a flag in the entry 3_1, thus, it can be determined that the user is redirected to another service board, and the data packet is sent to the service board 1_3 through a switch network according to the Slot 2_3 recorded in the entry 3_1.

After receiving the data packet, the data plane of the service board 1_3 searches for a corresponding route entry according to the destination IP address of the data packet, and search for a corresponding software user entry and a hardware user entry according to the source IP address PC-IP of the data packet. As a result, the software user entry 3_2 as shown in Table 3 and the hardware user entry 3_3 as shown in Table 4 are searched out. The data plane performs a corresponding operation according to the hardware user entry 3_3, e.g., statistically analyzing traffic and a time duration and performing user strategy control, and forwards the data packet according to the obtained route entry such that the data packet eventually reaches the Internet. For example, the data packet is forwarded to the egress service board 1_4, and the egress service board 1_4 forwards the data packet to the Internet.

A process of forwarding a data packet from an Internet to a user host includes procedures as follows.

After receiving a data packet to be sent to the user host, the service board 1_4 searches for a corresponding route entry according to a destination IP address PC-IP of the data packet. The route entry as shown in Table 5 is searched out, where a DDev in the route entry is RG e.g., a resource group, and a Dport in the route entry is the Slot 2_3. The service board 1_4 searches for a software user entry and a hardware user entry according to a destination IP address PC-IP of the data packet. Neither software user entry nor hardware user entry is searched out, and the data packet is forwarded to the service board 1_3 through a switch network according to the Slot 2_3 serving as the DPort in the obtained route entry.

After receiving the data packet, the service board 1_3 searches for a corresponding route entry according to the destination IP address PC-IP of the data packet. The route entry as shown in Table 5 is searched out, where a DDev in the route entry is RG e.g., a resource group, and a Dport in the route entry is the Slot 2_3. The service board 1_3 searches for a software user entry and a hardware user entry according to the destination IP address PC-IP of the data packet. As a result, the software user entry 3_2 and the hardware user entry 3_3 are searched out. The service board 1_3 performs a corresponding operation according to the hardware user entry 3_3, e.g., statistically analyzing traffic and a time duration and performing user strategy control, and forwards the data packet to the user host according to the Slot 2_1 recorded in the software user entry 3_2 through a switch network.

After receiving the data packet, the service board 1_1 forwards the data packet according to the method in FIG. 3 or according to the method in FIG. 4, then the data packet is forwarded to the user host.

In a case that the route entry is sent based on the first way, the route entry including the PC-IP on the data plane of the service board 1_1 is as shown in Table 5. The service board 1_1 executes procedures in FIG. 3 after receiving a data packet to be sent to the user host.

At block S301, a route entry is searched for according to the destination IP address PC-IP of the data packet, the route entry as shown in Table 5 is searched out, where a DDev in the route entry is RG; e.g., a resource group, and a Dport in the route entry is the Slot 2_3.

At block S302, a software user entry and a hardware user entry are searched for according to the destination IP address PC-IP of the data packet, and the software user entry 3_1 as shown in Table 2-3 is searched out.

At block S303, the data packet is forwarded to the user host according to an original port ID Port A recorded in the software user entry 3_1.

In another case that the route entry is sent based on the second way, the route entry including the PC-IP on the data plane of the service board 1_1 is as shown in table 6. After the service board 1_1 receives a data packet to be sent to the user host, procedures as shown in FIG. 4 are executed.

At block S401, a corresponding route entry is searched for according to a destination IP address PC-IP of the data packet, and the route entry as shown in table 6 is searched out, where a DDev in the route entry is the slot ID Slot 2_1 of the service board, and a DPort in the route entry is Port A.

At block S402, a software user entry and a hardware user entry are searched for according to a destination IP address PC-IP of the data packet, the software user entry 3_1 as shown in Table 2-3 is searched out and no hardware user entry is searched out.

At block S403, the data packet is forwarded to the user host according to the Port A recorded as the DPort in the obtained route entry.

The hardware user entry corresponding to the user access to the service board 1_1 is on the service board 1_3. To perform processing such as counting traffic can be for a data packet to be sent to the user host according to the hardware user entry, when the service board 1_3 sends an IP route entry of the user host, the service board 1_3 sets the destination device ID to be an ID of the resource group, set the destination port ID to be a slot ID of the service board 1_3, and synchronizes the route entry to other service boards, so that the other service boards sends the route entry. The service board firstly receiving a data packet sent from the Internet to the user host forwards the data packet to the service board 1_3 by searching for a route. The service board 1_3 performs processing such as counting traffic for the data packet sent to the user host according to the hardware user entry and forward the data packet to the service board 1_1. The data packet is then forwarded to the user host through the service board 1_1.

Methods according to the present disclosure are described above. Devices according to the present disclosure are described below.

Figure 5:
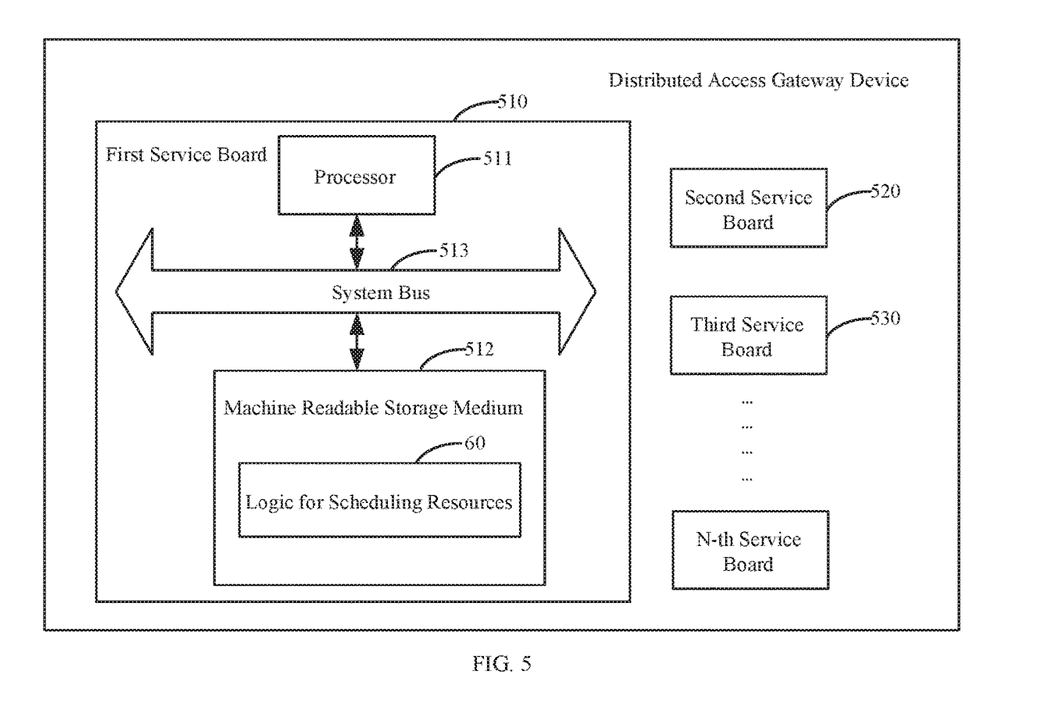
FIG. 5 is a schematic diagram illustrating a hardware structure of a distributed access gateway device according to an example of the present disclosure.

FIG. 5 is a schematic diagram illustrating a hardware structure of a distributed access gateway device according to an example of the present disclosure. In FIG. 5, the gateway device includes a plurality of service boards, e.g., first to N-th service boards, where the first service board 510 may be any of the plurality of service boards. The first service board 510 includes a processor 511 and a machine-readable storage medium 512 storing machine executable instructions. The processor 511 communicates with the machine-readable storage medium 512 via a system bus 513, and executes the method of scheduling resources described above by reading and executing the machine executable instructions corresponding to a logic for scheduling resources in the machine-readable storage medium 512.

As used herein, the machine-readable storage medium 512 may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof.

Figure 6:
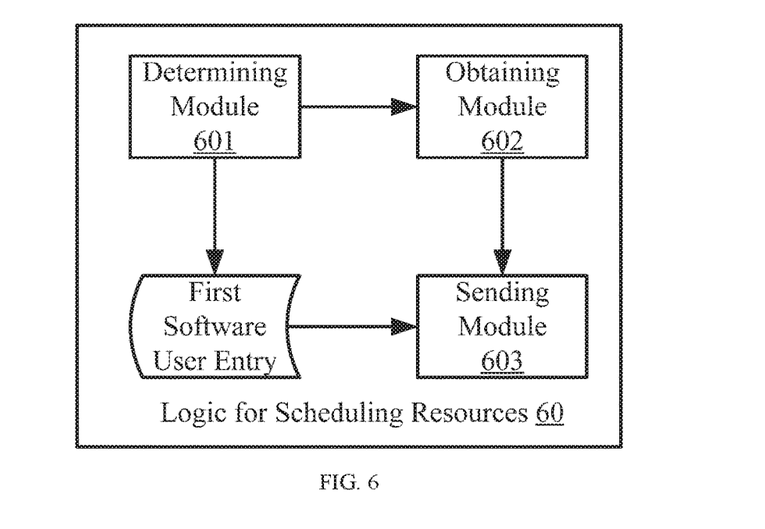
FIG. 6 is a schematic diagram illustrating a structure of a logic for scheduling resources according to an example of the present disclosure.

As shown in FIG. 6, functionally divided, the logic 60 for scheduling resource above includes some modules as follows.

A determining module 601 is configured to create a first software user entry corresponding to a first user on a data plane a first service board 510 on a distributed access gateway device after the first user passes authentication, determine whether there is an idle hardware resource on the first service board 510.

An obtaining module 602 is configured to obtain a slot ID of a second service board 520 comprising an idle hardware resource on the data plane when determining that there is no idle hardware resource on the first service board, wherein the second service board 520 is selected from a resource group, and the resource group comprises a plurality of service boards on the distributed access gateway device.

A sending module 603 is configured to send the first software user entry to the second service board 520 according to the slot ID of the second service board on the data plane in a way that the second service board 520 creates a first hardware user entry corresponding to the first user on a data plane of the second service board 520.

Figure 7:
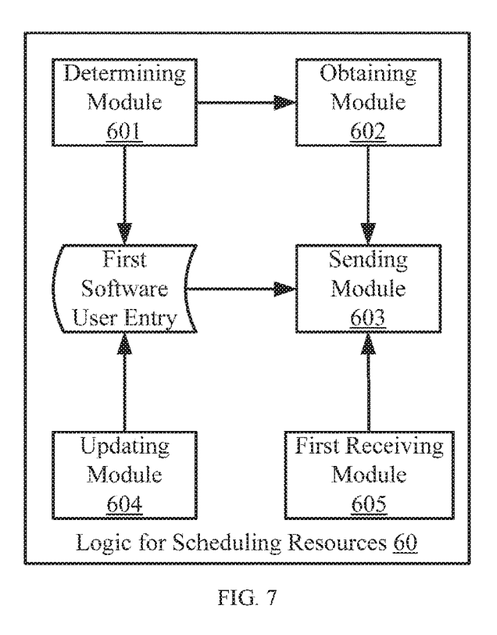
FIG. 7 is a schematic diagram illustrating a structure of a logic for scheduling resources according to an example of the present disclosure.

As shown in FIG. 7, the logic 60 of scheduling resources further includes an updating module 604 and a first receiving module 605.

The updating module 604 is configured to record the slot ID of the second service board 520 in the first software user entry on the data plane of the first service board when determining that the second service board 520 successfully creates the first hardware user entry corresponding to the first user.

The first receiving module 605 is configured to receive a data packet from a user host on the data plane.

The transmitting module 603 is further configured to forward the data packet to the second service board 520 according to the slot ID of the second service board 520 recorded in the first software user entry on the data plane when the received data packet is matched with the first software user entry.

Figure 8:
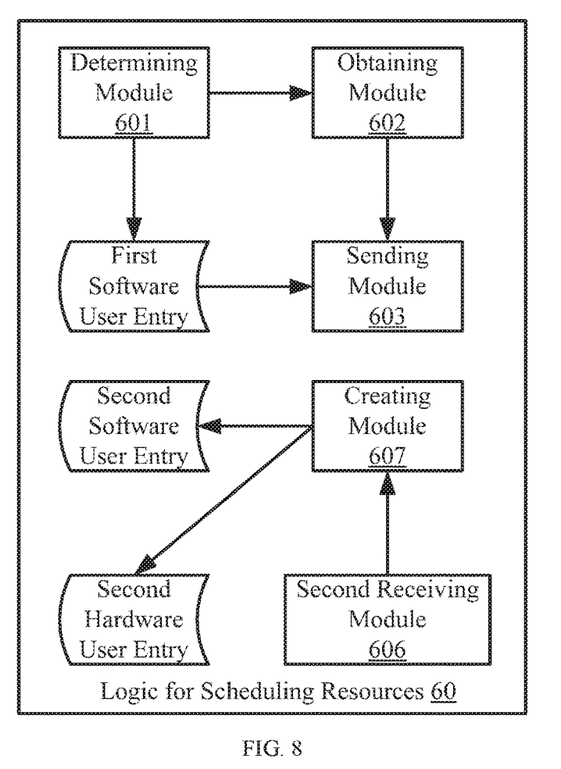
FIG. 8 is a schematic diagram illustrating a structure of a logic for scheduling resources according to an example of the present disclosure.

As shown in FIG. 8, the logic 60 of scheduling resources further includes a second receiving module 606 and a creating module 607.

The second receiving module 606 is configured to receive a software user entry corresponding to a second user from a third service board 530 on the data plane.

The creating module 607 is configured to create a second software user entry and a second hardware user entry corresponding to the second user according to the received software user entry, record an slot ID of the third service board 530 in the second software user entry.

The creating module 607 is further configured to create a first route entry comprising an host IP address of the second user on the data plane after creating the second software user entry and the second hardware user entry, wherein a destination device ID in the first route entry is an ID of the resource group, and a destination port ID in the first route entry is the slot ID of the first service board 510.

The sending module 603 is further configured to synchronize the first route entry to another service board in the resource group on the data plane.

In an example, the logic 60 of scheduling resources further includes a storing module 608.

The second receiving module 606 is further configured to receive a second route entry synchronized from a fourth service board on the data plane The storing module 608 is configured to store the route entry received by the second receiving module 606.

Figure 9:
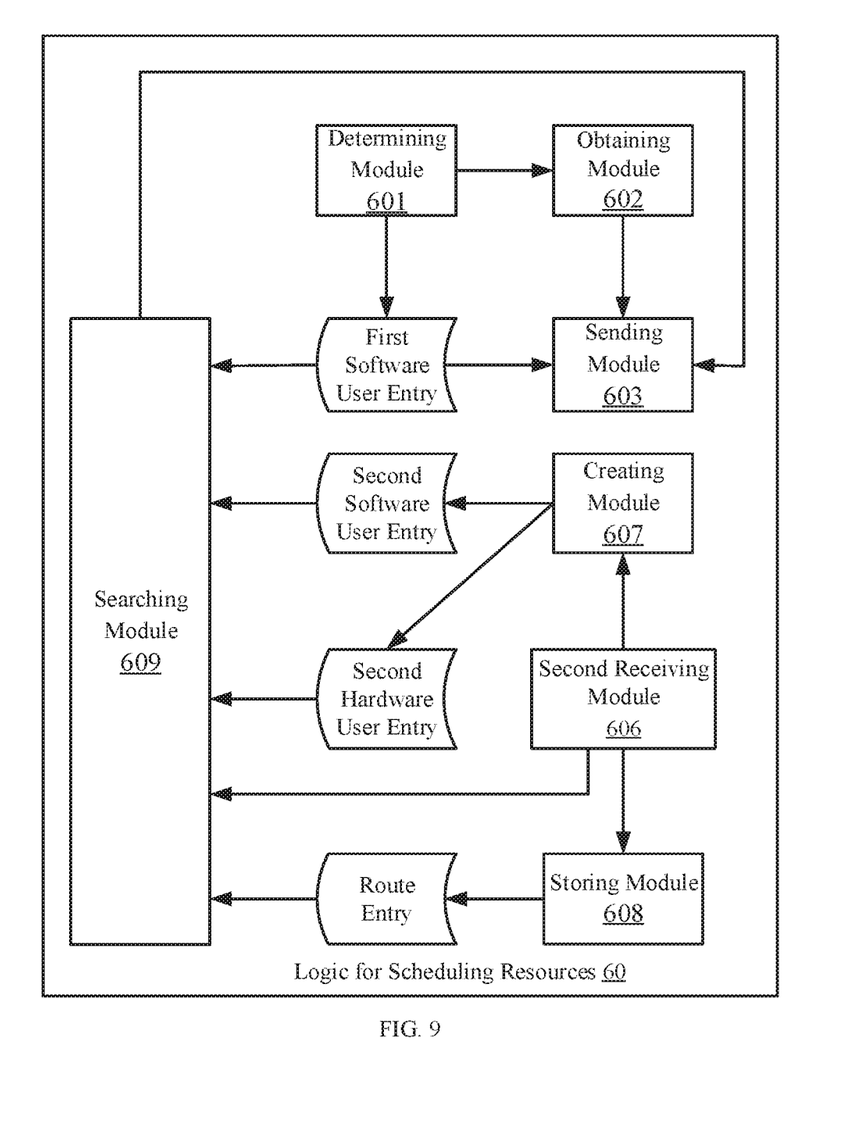
FIG. 9 is a schematic diagram illustrating a structure of a logic for scheduling resources according to an example of the present disclosure.

In an example, the first software user entry further records an ID of a port connected with a host of the first user on the first service board. As shown in FIG. 9, the logic 60 of scheduling resources further includes a storing module 608.

The second receiving module 606 is further configured to receive a second route entry synchronized from a fourth service board on the data plane.

The storing module 608 is configured to search for a software user entry corresponding to an IP address comprised in the second route entry on the data plane; store the second route entry on the data plane when no software user entry corresponding to the IP address is searched out; store the second route entry on the data plane, modify a destination device ID to the slot ID of the first service board in the second route entry, and modify a destination port ID to an ID of the port connected with the host of the first user on the first service board in the second route entry when the first software user entry is searched out, wherein the ID of the port connected with the host of the first user on the first service board is recorded in the first software user entry corresponding to the IP address.

As shown in FIG. 9, the logic 60 of scheduling resources further includes a searching module 609.

The second receiving module 606 is further configured to receive a data packet to be sent to a user host on the data plane.

The searching module 609 is configured to search for a third route entry corresponding to a destination IP address of the received data packet, wherein a destination device ID in the third route entry is the ID of the resource group, and a destination port ID in the third route entry is a slot ID; search for a software user entry and a hardware user entry corresponding to the destination IP address of the data packet on the data plane.

The sending module 603 is further configured to when neither software user entry nor hardware user entry corresponding to the destination IP address is searched out, forward the data packet to a service board corresponding to a slot according to the slot ID as the destination port ID in the third route entry on the data plane; when the second software user entry and the second hardware user entry are searched out, perform processing based on the second hardware user entry on the data plane, forward the data packet to the third service board based on a slot ID of the third service board recorded in the second software user entry; and when the first software user entry is searched out and no hardware user entry is searched out, forward the data packet to a host of the first user according to an ID of the port connected with the host of the first user on the first service board on the data plane, wherein the ID of the port is recorded in the first software user entry.

In the above device example, the first receiving module 605 and the second receiving module 606 are two independent units, or are integrated into one unit, which will not be limited herein.

Details of the implementation process of the functions and effects of different units in the above device may be seen from the implementation process of corresponding blocks in the above method, which will not be redundantly described herein.

Since the device embodiments substantially correspond to the method embodiments, a reference is made to part of the descriptions of the method embodiments for the related part. The device embodiments described above are merely illustrative, where the units described as separate members may be or not be physically separated, and the members displayed as units may be or not be physical units, i.e., is located in one place, or is distributed to a plurality of network units. Part or all of the modules may be selected according to actual requirements to implement the objectives of the solutions in the embodiments. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and a device provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A method of scheduling resources, comprising:
passing authentication, by a first user, on a data plane;
creating, by a first service board having its slot Identity (ID) on a distributed access gateway device, a first software user entry corresponding to the first user on the data plane after the first user passes the authentication;
determining, by the first service board, that there is no idle hardware resource on the first service board;
obtaining, by the first service board, a slot Identity (ID) of a second service board comprising an idle hardware resource on the data plane when determining that there is no idle hardware resource on the first service board, wherein the second service board is selected from a resource group, and the resource group comprises a plurality of service boards on the distributed access gateway device;
sending, by the first service board, the first software user entry to the second service board according to the slot ID of the second service board on the data plane such that the second service board creates a first hardware user entry corresponding to the first user on a data plane of the second service board and a new software user entry which records the slot Identity (ID) of the first service board and corresponds to the first user on a data plane of the second service board;
receiving, by the first service board, a software user entry corresponding to a second user from a third service board on the data plane;
creating, by the first service board, a second software user entry and a second hardware user entry corresponding to the second user according to the received software user entry;
recording, by the first service board, a slot ID of the third service board in the second software user entry;
creating, by the first service board, a first route entry comprising a host IP address of the second user on the data plane after creating the second software user entry and the second hardware user entry, wherein a destination device ID in the first route entry is an ID of the resource group, and a destination port ID in the first route entry is the slot ID of the first service board; and
synchronizing, by the first service board, the first route entry to another service board in the resource group on the data plane.

2. The method according to claim 1, further comprising:
recording, by the first service board, the slot ID of the second service board in the first software user entry on the data plane of the first service board when determining that the second service board successfully creates the first hardware user entry corresponding to the first user; and
receiving, by the first service board, a data packet from a user host on the data plane, and forwarding, by the first service board, the data packet to the second service board according to the slot ID of the second service board recorded in the first software user entry on the data plane when the received data packet is matched with the first software user entry.

3. The method according to claim 1, further comprising:
receiving and storing, by the first service board, a second route entry synchronized from a fourth service board on the data plane.

4. The method according to claim 3, further comprising:
receiving, by the first service board, a data packet to be sent to a user host on the data plane;
searching for, by the first service board, a third route entry corresponding to a destination IP address of the received data packet, wherein a destination device ID in the third route entry is the ID of the resource group, and a destination port ID in the third route entry is a slot ID;
searching for, by the first service board, a software user entry and a hardware user entry corresponding to the destination IP address of the data packet on the data plane;
when neither software user entry nor hardware user entry corresponding to the destination IP address is searched out, forwarding, by the first service board, the data packet to a service board corresponding to a slot according to the slot ID as the destination port ID in the third route entry on the data plane;
when the second software user entry and the second hardware user entry are searched out, performing, by the first service board, processing based on the second hardware user entry on the data plane, forwarding, by the first service board, the data packet to the third service board based on a slot ID of the third service board recorded in the second software user entry; and
when the first software user entry is searched out and no hardware user entry is searched out, forwarding, by the first service board, the data packet to a host of the first user according to an ID of the port connected with the host of the first user on the first service board on the data plane, wherein the ID of the port is recorded in the first software user entry.

5. The method according to claim 1, wherein the first software user entry further records an ID of a port connected with a host of the first user on the first service board;
the method further comprising:
receiving, by the first service board, a second route entry synchronized from a fourth service board on the data plane;
searching for, by the first service board, a software user entry corresponding to an IP address comprised in the second route entry on the data plane;
storing, by the first service board, the second route entry on the data plane when no software user entry corresponding to the IP address is searched out;
storing, by the first service board, the second route entry on the data plane;
modifying, by the first service board, a destination device ID to the slot ID of the first service board in the second route entry; and
modifying, by the first service board, a destination port ID to an ID of the port connected with the host of the first user on the first service board in the second route entry when the first software user entry is searched out, wherein the ID of the port connected with the host of the first user on the first service board is recorded in the first software user entry corresponding to the IP address.

6. A distributed access gateway device, comprising:
a plurality of service boards, wherein
a first service board comprises:
a processor, and
a non-transitory machine-readable storage medium storing machine executable instructions which are executable by the processor to:
pass authentication, by a first user, on a data plane;
create a first software user entry corresponding to the first user on the data plane after the first user passes the authentication;
determine that there is no idle hardware resource on the first service board having its slot Identity (ID) on the distributed access gateway device;
obtain a slot Identity (ID) of a second service board comprising an idle hardware resource on the data plane when determining that there is no idle hardware resource on the first service board, wherein the second service board is selected from a resource group, and the resource group comprises a plurality of service boards on the distributed access gateway device;
send the first software user entry to the second service board according to the slot ID of the second service board on the data plane such that the second service board creates a first hardware user entry corresponding to the first user on a data plane of the second service board and a new software user entry which records the slot Identity (ID) of the first service board and corresponds to the first user on a data plane of the second service board;
receive a software user entry corresponding to a second user from a third service board on the data plane;

create a second software user entry and a second hardware user entry corresponding to the second user according to the received software user entry;
record a slot ID of the third service board in the second software user entry;
create a first route entry comprising a host IP address of the second user on the data plane after creating the second software user entry and the second hardware user entry, wherein a destination device ID in the first route entry is an ID of the resource group, and a destination port ID in the first route entry is the slot ID of the first service board; and
synchronize the first route entry to another service board in the resource group on the data plane.

7. The distributed access gateway device according to claim 6, wherein the processor is caused by the machine-executable instructions further to:
record the slot ID of the second service board in the first software user entry on the data plane of the first service board when determining that the second service board successfully creates the first hardware user entry corresponding to the first user; and
receive a data packet from a user host on the data plane, and forward the data packet to the second service board according to the slot ID of the second service board recorded in the first software user entry on the data plane when the received data packet is matched with the first software user entry.

8. The distributed access gateway device according to claim 6, wherein the processor is caused by the machine-executable instructions further to:
receive and store a second route entry synchronized from a fourth service board on the data plane.

9. The distributed access gateway device according to claim 8, wherein the processor is caused by the machine-executable instructions further to:
receive a data packet to be sent to a user host on the data plane;
search for a third route entry corresponding to a destination IP address of the received data packet, wherein a destination device ID in the third route entry is the ID of the resource group, and a destination port ID in the third route entry is a slot ID;
search for a software user entry and a hardware user entry corresponding to the destination IP address of the data packet on the data plane;
when neither software user entry nor hardware user entry corresponding to the destination IP address is searched out, forward the data packet to a service board corresponding to a slot according to the slot ID as the destination port ID in the third route entry on the data plane;
when the second software user entry and the second hardware user entry are searched out, perform processing based on the second hardware user entry on the data plane, forward the data packet to the third service board based on a slot ID of the third service board recorded in the second software user entry; and
when the first software user entry is searched out and no hardware user entry is searched out, forward the data packet to a host of the first user according to an ID of the port connected with the host of the first user on the first service board on the data plane, wherein the ID of the port is recorded in the first software user entry.

10. The distributed access gateway device according to claim 6, wherein the first software user entry further records an ID of a port connected with a host of the first user on the first service board,
the processor is caused by the machine-executable instructions further to:
receive a second route entry synchronized from a fourth service board on the data plane;
search for a software user entry corresponding to an IP address comprised in the second route entry on the data plane;
store the second route entry on the data plane when no software user entry corresponding to the IP address is searched out;
store the second route entry on the data plane;
modify a destination device ID to the slot ID of the first service board in the second route entry; and
modify a destination port ID to an ID of the port connected with the host of the first user on the first service board in the second route entry when the first software user entry is searched out, wherein the ID of the port connected with the host of the first user on the first service board is recorded in the first software user entry corresponding to the IP address.

11. A non-transitory machine-readable storage medium storing machine executable instructions which are invoked and executed by a processor of a network device to:
pass authentication, by a first user, on a data plane;
create a first software user entry corresponding to the first user on the data plane after the first user passes the authentication;
determine that there is no idle hardware resource on the first service board having its slot Identity (ID) on a distributed access gateway device;
obtain a slot Identity (ID) of a second service board comprising an idle hardware resource on the data plane when determining that there is no idle hardware resource on the first service board, wherein the second service board is selected from a resource group, and the resource group comprises a plurality of service boards on the distributed access gateway device;
send the first software user entry to the second service board according to the slot ID of the second service board on the data plane such that the second service board creates a first hardware user entry corresponding to the first user on a data plane of the second service board and a new software user entry which records the slot Identity (ID) of the first service and corresponds to the first user on a data plane of the second service board;
receive a software user entry corresponding to a second user from a third service board on the data plane;
create a second software user entry and a second hardware user entry corresponding to the second user according to the received software user entry;
record a slot ID of the third service board in the second software user entry;
create a first route entry comprising a host IP address of the second user on the data plane after creating the second software user entry and the second hardware user entry, wherein a destination device ID in the first route entry is an ID of the resource group, and a destination port ID in the first route entry is the slot ID of the first service board; and
synchronize the first route entry to another service board in the resource group on the data plane.

* * * * *